(12) United States Patent
Chinomi et al.

(10) Patent No.: US 10,748,418 B2
(45) Date of Patent: Aug. 18, 2020

(54) VEHICLE MANAGEMENT SYSTEM AND VEHICLE MANAGEMENT METHOD

(71) Applicant: NISSAN MOTOR CO., LTD., Kanagawa (JP)

(72) Inventors: Satoshi Chinomi, Kanagawa (JP); Kayoko Hara, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/170,973

(22) Filed: Oct. 25, 2018

(65) Prior Publication Data

US 2019/0108750 A1 Apr. 11, 2019

Related U.S. Application Data

(63) Continuation of application No. 14/896,540, filed as application No. PCT/JP2014/060389 on Apr. 10, 2014, now Pat. No. 10,140,858.

(30) Foreign Application Priority Data

Jun. 11, 2013 (JP) .................................. 2013-122586

(51) Int. Cl.
*G06Q 10/02* (2012.01)
*G08G 1/065* (2006.01)
(Continued)

(52) U.S. Cl.
CPC ............. *G08G 1/065* (2013.01); *G06Q 10/08* (2013.01); *G06Q 50/10* (2013.01); *G08G 1/137* (2013.01);
(Continued)

(58) Field of Classification Search
CPC ........ G06Q 10/02; G06Q 10/08; G06Q 50/10; G08G 1/065; G08G 1/137; G08G 1/144;
(Continued)

(56) References Cited

U.S. PATENT DOCUMENTS 6,405,125 B1 6/2002 Ayed
7,941,354 B2 5/2011 Breen
(Continued)

FOREIGN PATENT DOCUMENTS

JP 2003-162576 A 6/2003
JP 2005-78223 A 3/2005
(Continued)

*Primary Examiner* — An T Nguyen
(74) *Attorney, Agent, or Firm* — Osha Liang LLP (57) ABSTRACT

A vehicle management system for managing vehicles used by users has a usage managing unit that accepts a user's request for using the vehicle and to set a return space among parking spaces as a planned return space when the user's request is accepted, the return space being a space to which the vehicle is to be returned by the user after the vehicle is used by the user, a return determining unit that determines whether or not the vehicle is returned to the planned return space set by the usage managing unit when the vehicle is actually used and returned by the user, a return permitting unit that permits a return of the vehicle in a case where the return determining unit determines that the vehicle is returned to the planned return space, and a notification unit.

9 Claims, 5 Drawing Sheets

(51) Int. Cl.
*H04W 4/02* (2018.01)
*G06Q 50/10* (2012.01)
*G06Q 10/08* (2012.01)
*G08G 1/137* (2006.01)
*H04W 4/40* (2018.01)
*G08G 1/14* (2006.01)

(52) U.S. Cl.
CPC ............... *H04W 4/02* (2013.01); *H04W 4/40* (2018.02); *G08G 1/144* (2013.01)

(58) Field of Classification Search
CPC ....... G08G 1/146; G08G 1/205; H04W 4/046; G05D 1/0276; B60L 11/1838
See application file for complete search history.

(56) References Cited

U.S. PATENT DOCUMENTS

| | | |
|---|---|---|
| 2002/0184062 A1 | 12/2002 | Diaz |
| 2002/0186144 A1 | 12/2002 | Meunier |
| 2003/0074134 A1 | 4/2003 | Shike et al. |
| 2004/0176969 A1 | 9/2004 | Fujinuma |
| 2005/0012589 A1 | 1/2005 | Kokubu et al. |
| 2006/0259353 A1 | 11/2006 | Gutmann |
| 2007/0143207 A1 | 6/2007 | Breen |
| 2009/0098907 A1 | 4/2009 | Huntzicker et al. |
| 2010/0211307 A1 | 8/2010 | Geelen |
| 2011/0060480 A1 | 3/2011 | Mottla et al. |
| 2011/0213629 A1 | 9/2011 | Clark et al. |
| 2012/0098677 A1 | 4/2012 | Geelen |
| 2012/0191511 A1 | 7/2012 | Li |
| 2012/0218122 A1* | 8/2012 | Bogaard ................ G07B 15/02 340/870.03 |
| 2013/0290199 A1 | 10/2013 | Camacho et al. |
| 2013/0325564 A1 | 12/2013 | Kwong |
| 2014/0051465 A1 | 2/2014 | Ruys et al. |
| 2014/0129113 A1 | 5/2014 | Van Wiemeersch et al. |
| 2014/0156110 A1 | 6/2014 | Ehrman |
| 2014/0156111 A1 | 6/2014 | Ehrman |
| 2014/0207498 A1* | 7/2014 | Cho ...................... G06Q 10/02 705/5 |
| 2014/0236645 A1* | 8/2014 | Aaron .................... G06Q 10/02 705/5 |
| 2014/0379185 A1 | 12/2014 | Lambrinos et al. |
| 2015/0032312 A1 | 1/2015 | Lambrinos et al. |
| 2015/0051926 A1 | 2/2015 | Aaron et al. |
| 2015/0161543 A1 | 6/2015 | Kadir et al. |
| 2015/0325058 A1 | 11/2015 | Lambrinos et al. |
| 2015/0348178 A1 | 12/2015 | Taylor et al. |
| 2015/0348179 A1* | 12/2015 | Kamisawa ............. G08G 1/205 705/5 |
| 2016/0111000 A1* | 4/2016 | Chinomi ................ G06Q 10/08 340/932.2 |
| 2016/0240083 A1 | 8/2016 | Chinomi |
| 2016/0246303 A1 | 8/2016 | Chinomi et al. |

FOREIGN PATENT DOCUMENTS

| | | |
|---|---|---|
| JP | 2010-146229 A | 7/2010 |
| JP | 2011-128987 A | 6/2011 |
| JP | 2011-253321 A | 12/2011 |
| WO | 2009/156185 A1 | 12/2009 |

* cited by examiner

VEHICLE MANAGEMENT SYSTEM AND VEHICLE MANAGEMENT METHOD

CROSS-REFERENCE TO RELATED APPLICATIONS

The present application is a continuation application of U.S. patent application Ser. No. 14/896,540, which is a national stage application of PCT/JP2014/060389, and claims priority to Japanese Patent Application No. 2013-122586 filed with the Japan Patent Office on Jun. 11, 2013, the contents of which are incorporated by reference in their entirety.

BACKGROUND OF THE INVENTION

1. Technical Field of the Invention

The present invention relates to a vehicle management system and a vehicle management method for managing vehicles used by users.

2. Description of the Related Art

Conventionally, in a vehicle sharing (car sharing) service in which vehicles are shared among users and rented to users, there is so-called a drop off type vehicle sharing service in which a user returns a vehicle that has been used to a space other than a space at which the shared vehicle is picked up. A drop off type service for acquiring the positional information of a vehicle by using a GPS and determining whether or not the vehicle is returned to a correct return space on the basis of the acquired positional information of the vehicle has been known (see Patent Document 1 (Japanese Patent Application Publication No. 2011-128987 A)).

SUMMARY OF THE INVENTION

In the conventional system disclosed in Patent Document 1 described above, when a user uses a vehicle and then returns the vehicle that has been used, the user can arbitrary select a return space for the vehicle. If, in this case, another vehicle has already been parked at a selected return space, the vehicle cannot be returned.

One or more embodiments of the present invention provides a vehicle management system and a vehicle management method returning a vehicle to an appropriate return space in a case where so-called a drop off type is adopted in a vehicle sharing service.

One or more embodiments of the present invention permits a return of a vehicle in a predetermined case. More specifically, at a time point when a request for using a vehicle is accepted, a space to which the vehicle that is returned after being used by a user is set as a planned return space. Then, when the user actually uses and returns the vehicle, it is determined whether or not the vehicle is returned to the planned return space, and the return of the vehicle is permitted in a case where the vehicle is returned to the planned return space.

According to one or more embodiments of the present invention, in a case where so-called a drop off type is adopted in a vehicle sharing service, at a time point when a request for using a vehicle is accepted, a planned return space for the vehicle is acquired. In addition, the return process is controlled so as not to be completed unless the vehicle is returned to the planned return space. This results in the vehicle used by the user being returned to an appropriate return space.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
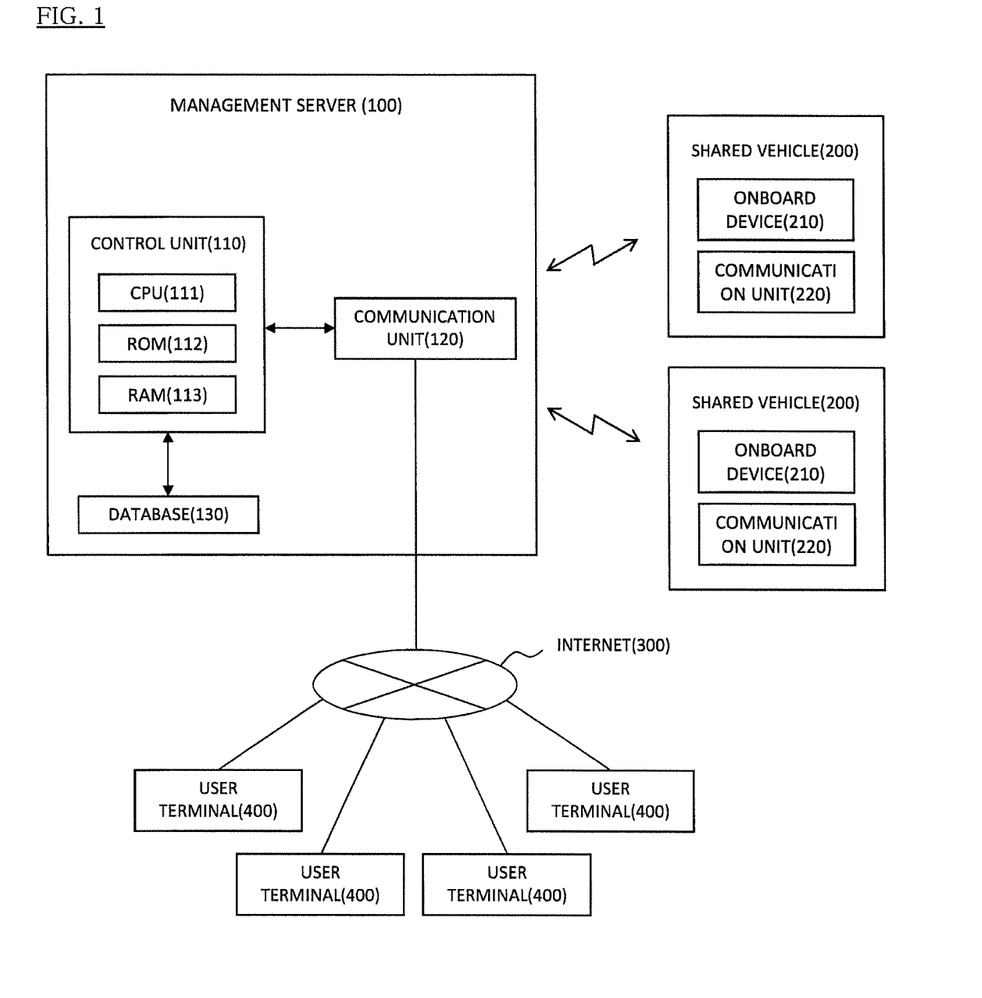
FIG. 1 is a configuration diagram of a vehicle sharing system according to one or more embodiments of the present invention.

FIG. 1 is the block configuration diagram of a vehicle sharing system according to one or more embodiments of the present invention. As illustrated in FIG. 1, the vehicle sharing system according to one or more embodiments of the present invention comprises: a management server 100; shared vehicles 200 provided for vehicle sharing service; and user terminals 400 that are communicable with the vehicle management server 100 through the Internet 300. In FIG. 1, while only two shared vehicles 200 are illustrated, the vehicle sharing system according to one or more embodiments of the present invention is configured by many shared vehicles 200. In the vehicle sharing system according to one or more embodiments of the present invention, many shared vehicles 200 are parked at predetermined parking spaces disposed at various places. In one or more embodiments of the present invention, specified users can select and use the shared vehicles 200 parked at desired parking spaces.

As illustrated in FIG. 1, the shared vehicle 200 includes an onboard device 210 and a communication unit 220. The shared vehicle 200 can communicate with the management server 100. The onboard device 210 transmits information of use start time and use end time, information of a traveling distance, information of the vehicle position, and the like of the shared vehicle 200 from the communication unit 220 to a communication unit 120 included in the management server 100 through wireless communication.

In addition, the onboard device 210 can acquire the information of the vehicle position as below. For example, the onboard device 210 can acquire real-time positional information of each shared vehicle 200 by receiving electric waves transmitted from positioning satellites using a global positioning system (GPS) for every predetermined time.

The user terminals 400 are terminals owned by specified users using the vehicle sharing system according to one or more embodiments of the present invention. The user terminal 400 is communicable with the communication unit 120 through the Internet 300. The communication unit 120 is included in the management server 100. In the vehicle sharing system according to one or more embodiments of the present invention, each user can make a use request for using a shared vehicle 200 with the user terminal 400.

Here, the use request for a shared vehicle 200 may be a request for an immediate use or a request for a reservation. The request for an immediate use is a request for using a shared vehicle 200 immediately after the user's request for the use. The request for a reservation is a request for using a shared vehicle 200 in the future. In such a request for an immediate use, a planned return time when the user returns a shared vehicle 200 after using the shared vehicle 200 may be set at the time point of the use request. Alternatively, in such a request for an immediate use, a planned return time may not be set at the time point of the use request. In a case where the planned return time is not set at the time point of the use request, after actually using the shared vehicle 200, the user may return the shared vehicle 200 at arbitrary timing.

In addition, in the vehicle sharing system according to one or more embodiments of the present invention, when a request for using a shared vehicle 200 is made by using the user terminal 400, the user sets a planned return space for the shared vehicle 200. Here, the planned return space is a space to which user returns the shared vehicle 200 after use. In this way, in one or more embodiments of the present invention, so-called a drop off type vehicle sharing service in which the user returns a shared vehicle 200 that has been used to a space other than a space (hereinafter referred to as a renting space) where the user has picked up the shared vehicle can be provided.

As examples of the user terminals 400, there are various mobile terminals such as cellular phones in addition to personal computers (PC). In FIG. 1, for example, while four terminals are illustrated as the user terminals 400, both the number of user terminals 400 and the number of users using the vehicle sharing system according to one or more embodiments of the present invention are not particularly limited.

The management server 100 includes a control unit 110, a communication unit 120 and a database 130.

The communication unit 120 is a device used for communicating with the communication unit 220 included in each shared vehicle 200. In addition, the communication unit 120 is a device used for communicating with the user terminal 400 owned by each user through the Internet 300. The communication unit 120 acquires the information of use start time and use end time, the information of a traveling distance, the information of the vehicle position, and the like related to the shared vehicle 200 from the onboard device 210 through wireless communication. In addition, the communication unit 120 acquires the information of a user's request for using a shared vehicle 200, the information of a planned return space set by the user, and the like from the user terminal 400.

The database 130 is a storage device used for storing use acceptance information and planned return space information for each shared vehicle 200. Here, each of the use acceptance information and the planned return space information is information that is generated for each shared vehicle 200 on the basis of information transmitted from the user terminal 400. The use acceptance information and the planned return space information are generated when the use request and the setting of the planned return space for the shared vehicle 200 are made by a user through the user terminal 400.

Figure 2:
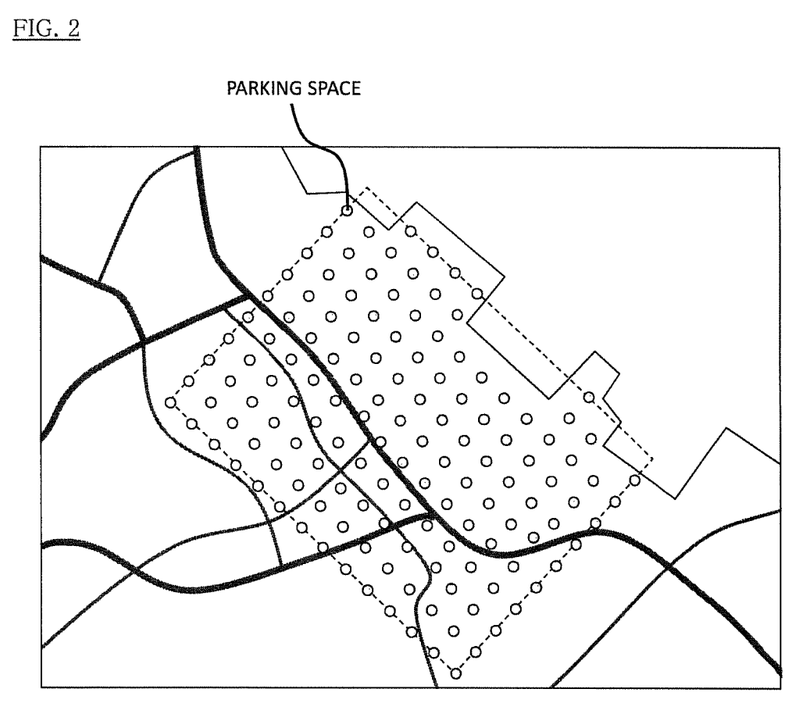
FIG. 2 is a diagram that illustrates an example in which parking spaces are arranged in a predetermined district.

In addition, in the database 130, information of parking spaces used for parking the shared vehicles 200 is stored. For example, as illustrated in FIG. 2, in the database 130, positional information of parking spaces disposed in a predetermined district surrounded by broken lines on the map are stored. In the vehicle sharing system according to one or more embodiments of the present invention, such parking spaces are parking lots used for parking the shared vehicles 200, and the shared vehicles 200 are parked in some of all the parking spaces. In one or more embodiments of the present invention, as a user makes a use request through the user terminal 400, a desired shared vehicle 200 can be used.

The control unit 110 of the management server 100, as illustrated in FIG. 1, includes: a read only memory (ROM) 112 in which various programs are stored; a central processing unit (CPU) 111 as an operation circuit executing a program stored in the ROM 112; and a random access memory (RAM) 113 serving as an accessible memory device.

In order to manage the vehicle sharing system according to one or more embodiments of the present invention, the control unit 110 has a usage management function, a return determining function, and a return permitting function. The control unit 110 can execute each of the functions described above by cooperative operations of software used for realizing each of the functions and the hardware described above.

Hereinafter, each function realized by the control unit 110 of the management server 100 will be described.

First, the usage management function of the control unit 110 will be described. In a case where the user makes a use request for using the shared vehicle 200 by operating the user terminal 400, the control unit 110 generates use acceptance information for each shared vehicle 200 on the basis of the information of a use request transmitted from the user terminal 400. More specifically, the use acceptance information for each shared vehicle 200 contains information of the use start time, the planned return time, and the like of the shared vehicle 200 for which the user has made a use request. The control unit 110 stores the generated use acceptance information for each shared vehicle 200 in the database 130.

For example, the user operates the user terminal 400 so as to acquire information of a vehicle model and the like of a shared vehicle 200 that is not currently occupied (used or reserved for use) by any other user among the shared vehicles 200 parked in the parking spaces from the management server 100. Next, the user selects a shared vehicle 200 that is parked at a desired parking space on the basis of the acquired information by using the user terminal 400. The user inputs use start time and planned return time of the selected shared vehicle 200 so as to make a use request. Then, the control unit 110 receives information of such a use request made by the user from the user terminal 400. On the basis of the received information, the control unit 110 generates use acceptance information of the use start time, the planned return time, and the like for the shared vehicle 200 selected by the user. In addition, the control unit 110 stores the generated use acceptance information in the database 130.

Next, the control unit 110 reads information of all the parking spaces from the database 130. The control unit 110 extracts at least one proposed return space (one return candidate space) that is a currently available parking space from among the read parking spaces. The control unit 110 transmits information of the extracted proposed return spaces to the user terminal 400 so as to provide the information for the user. As each proposed return space that is a currently available parking space, for example, there is a parking space, in which any vehicle has not been parked, not being set as a planned return space of any shared vehicle 200.

In a case where the user selects any one of such proposed return spaces as a planned return space for the shared vehicle 200 to be used by operating the user terminal 400, the information of the selected planned return space is transmitted from the user terminal 400 to the control unit 110. The control unit 110 generates planned return space information of the shared vehicle 200 on the basis of the transmitted information and stores the generated planned return space information of the shared vehicle 200 in the database 130.

In one or more embodiments of the present invention, the parking spaces used for setting planned return spaces, as illustrated in FIG. 2, are disposed at a small gap within a relatively small district. Accordingly, in one or more embodiments of the present invention, a vehicle sharing service of so-called a small-distance drop off type is provided in which a renting space and a return space of a shared vehicle 200 are located at a relatively short distance. Here, in one or more embodiments of the present invention, the gap between parking spaces is not particularly limited but may be appropriately set in accordance with the geography, the road condition, presence/absence of a commercial facility near the parking spaces, and the like. However, according to one or more embodiments of the present invention, the gap is set between the parking spaces as a gap at which a user can easily come and go on foot. Accordingly, also in a case where a parking space to be set by the user as a planned return space cannot be used due to a situation in which the parking space has already been set as a planned return space by any one of the shared vehicles 200 or the like, the user may set a parking space located close to any one's planned return space as a planned return space. For this reason, the user's convenience at the time of returning the shared vehicle 200 is improved.

Furthermore, in the vehicle sharing system according to one or more embodiments of the present invention, as described above, by setting the proposed return spaces extracted by the control unit 110 as parking spaces that have not been set as planned return spaces of any one, it can be prevented to set the planned return spaces to be double booking among users. In other words, while a shared vehicle 200 is occupied (used or reserved for use) by a user, and a planned return space is set, the control unit 110 does not extract the planned return space of the occupied shared vehicle 200 as a return candidate space for any other user. Accordingly, a double booking of the planned return space can be prevented when any other user sets a planned return space among the proposed return spaces. For this reason, while one user occupies a shared vehicle 200, the other user is prevented to park a shared vehicle 200 at the planned return space set by the one user. Accordingly, the user can return the shared vehicle 200 at any time.

Particularly, one or more embodiments of the present invention, as described above, provides a vehicle sharing service of the short distance drop off type. In such a vehicle sharing service, the processing of a user's request for using the shared vehicle 200 is requested to be simplified such that the user can use the shared vehicle 200 in a simplified manner at least for a short time. In a vehicle sharing service of the short distance drop off type in one or more embodiments of the present invention, there are cases where a method is used in which planned return time of a shared vehicle 200 is not set at the time point of the acceptance of a use request, and, after the shared vehicle 200 is used, the user returns the shared vehicle 200 at desired timing. According one or more embodiments of the present invention, also in such a case, the user selects a planned return space from among proposed return spaces that are parking spaces each not being set as a planned return space for any shared vehicle 200 so as not to be double booking of an planned return space. Therefore, the user can return the shared vehicle 200 at any time. Accordingly, the convenience of the vehicle sharing service is improved.

In addition, in the vehicle sharing system of the short distance drop off type according to one or more embodiments of the present invention, since a distance between a user's renting space and a return space for the shared vehicle 200 is relatively short, the user's use time of the shared vehicle 200 is relatively short. Accordingly, a time limiting the setting of a planned return space for the other user is shortened. In the vehicle sharing service according to one or more embodiments of the present invention, the user's convenience is improved without blocking any other user's setting of a planned return space.

Furthermore, in one or more embodiments of the present invention, the number of parking spaces used for extracting proposed return spaces is more than the number of the shared vehicles 200. In other words, the number of parking spaces illustrated in FIG. 2 is more than the number of the shared vehicles 200 provided for the vehicle sharing service. Accordingly, when the control unit 110 extracts proposed return spaces that are parking spaces each not being set as a planned return space for any shared vehicle 200 from among all the parking spaces, at least one proposed return space can be extracted. For this reason, the control unit 110 provides information of extracted proposed return spaces for the user so that the user can reliably secure a planned return space among the proposed return spaces. In the vehicle sharing service according to one or more embodiments of the present invention, the processing of the setting of a planned returned space by the user is simplified, and the program structure of the vehicle sharing system can be simplified.

Next, the return determining function of the control unit 110 will be described. When a user returns a shared vehicle 200 after using, the control unit 110 determines whether or not the shared vehicle 200 is returned to a planned return space that has been set. More specifically, first, by commanding the onboard device 210 of the returned shared vehicle 200, the control unit 110 acquires the positional information of the shared vehicle 200 by a GPS or the like. In addition, the control unit 110 acquires the planned return space information of the returned shared vehicle 200 by extracting the information from the database 130. Then, the control unit 110 compares the positional information of the shared vehicle 200 with the planned return space information and determines that the shared vehicle 200 has been returned to the planned returned space in a case where the position of the shared vehicle 200 is almost the same as the position of the planned return space.

In the vehicle sharing system according to one or more embodiments of the present invention, as a method of determining whether or not the shared vehicle 200 has been returned to the planned returned position, as described above, the method using the GPS is applied so that a device such as a navigation device included in the shared vehicle 200 can be additionally used. Accordingly, the control unit 110 can easily make a determination without building a new system.

In addition, in one or more embodiments of the present invention, in a case where the above-described determination is made using the GPS, a position detecting error of the GPS may be considered. More specifically, in addition to a case where the shared vehicle 200 positioned by the GPS is located at the planned return space, also in a case where the planned return space for the returned shared vehicle 200 is located within the position detecting error range of the GPS and a parking space other than the planned return space is not located within a position detecting error range of the GPS, the control unit 110 may determine that the shared vehicle 200 has been returned to the planned return space. In this way, when it is determined whether or not the shared vehicle 200 has been returned to the planned return space by using the GPS, the determination can be made in a broader range by considering the position detecting error of the GPS as well as an erroneous determination is prevented.

Particularly, since one or more embodiments of the present invention provides the vehicle sharing service of the short distance drop off type, parking spaces are located at a relatively short distance, and accordingly, there are cases where two or more parking spaces are located within the position detecting error range of the GPS. In such a case, it cannot be correctly determined whether or not the shared vehicle 200 has been returned to the planned return space. In contrast to this, as described above, by checking that a parking space other than the planned return space for the returned shared vehicle 200 is not located within the position detecting error range of the GPS, an erroneous determination is prevented, and an appropriate determination can be made.

Next, the return permitting function of the control unit 110 will be described. In a case where it is determined that the shared vehicle 200 has been returned to the planned return space by using the return determining function described above, the control unit 110 permits the user's return of the shared vehicle 200. In addition, the control unit 110 notifies the user of the completion of the return of the shared vehicle 200 through the user terminal 400 and ends the process of returning the shared vehicle 200.

As above, in the vehicle sharing system according to one or more embodiments of the present invention, a request for using the shared vehicle 200 and the setting of a planned return space are made by the user. Then, the process of returning the shared vehicle 200 after the user' use of the shared vehicle 200 is executed.

In one or more embodiments of the present invention, the control unit 110 sets a planned return space for the shared vehicle 200 at a time point when a user's request for using the shared vehicle 200 is accepted. Then, when the user returns the shared vehicle 200 after using the shared vehicle 200, in a case where the shared vehicle 200 is not returned to the planned return space, the control unit 110 controls the return process so as not to be completed. In this way, when the drop off type service is provided in the vehicle sharing service, the shared vehicle 200 used by the user can be returned to an appropriate return space.

In addition, in one or more embodiments of the present invention, after a user requests for using the shared vehicle 200, the user can reset the planned return space for the shared vehicle 200 to another parking space while the user occupies (uses or reserved for use) the shared vehicle 200.

For example, in a case where the user makes a request for resetting the planned return space by operating the user terminal 400, the control unit 110 reads information of parking spaces from the database 130 and transmits information of proposed return spaces extracted from the parking spaces to the user terminal 400. Then, in a case where the user selects a proposed return space to be reset as the planned return space from among the proposed return spaces transmitted from the control unit 110 by operating the user terminal 400, the control unit 110 resets the proposed return space selected by the user as the planned return space for the shared vehicle 200 occupied by the user. In this way, according to one or more embodiments of the present invention, the user occupying the shared vehicle 200 can appropriately change the planned return space used for returning the shared vehicle 200. For this reason, according to one or more embodiments of the present invention, the flexibility at the time of returning the shared vehicle 200 enhances, and the convenience of the vehicle sharing service is improved.

Alternatively, as the method of resetting the planned return space of a shared vehicle 200, the following method may be used. First, in a case where a user requests to reset the planned return space, the control unit 110 reads information of parking spaces from the database 130. Next, the control unit 110 directly transmits the information of parking spaces to the user terminal 400 so as to provide the information for the user. Then, in a case where the user selects a parking space to be reset as the planned return space on the basis of the provided information of parking spaces, the control unit 110 determines whether or not the parking space selected by the user is currently available. For example, in a case where it is checked that no vehicle is parked at the parking space selected by the user, the control unit 110 determines that the parking space is currently available. Then, in a case where the selected parking space is determined to be currently available, the control unit 110 resets the selected parking space as the planned return space for the shared vehicle 200 that is occupied by the user.

Figure 3:
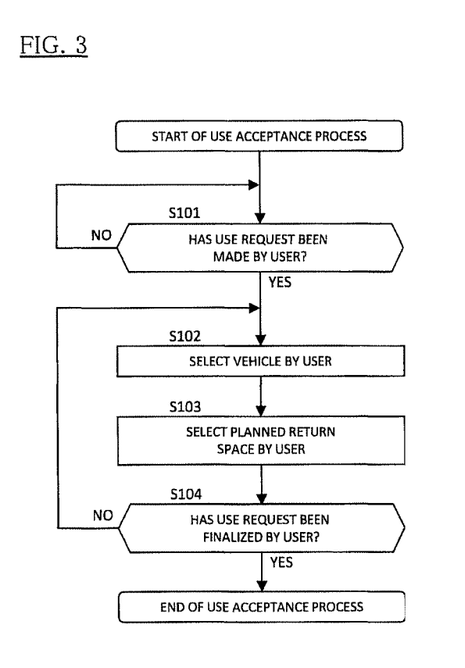
FIG. 3 is a flowchart that illustrates a process for accepting the request for using a vehicle according to one or more embodiments of the present invention.

Next, the operation according to one or more embodiments of the present invention will be described. FIG. 3 is a flowchart that illustrates an example of the operation executed when a request for using a shared vehicle 200 is accepted in one or more embodiments of the present invention.

First, in Step S101, the control unit 110 of the management server 100 determines whether or not a request for using a shared vehicle 200 is made through the user terminal 400 by any user among users using the vehicle sharing system according to one or more embodiments of the present invention. In a case where the use request is made by any user, the process proceeds to Step S102. On the other hand, in a case where the use request is not made by any user, the process waits in Step S101.

In Step S102, the control unit 110 extracts shared vehicles 200 that are not currently occupied (used or reserved for use) by any user on the basis of the use acceptance information of each shared vehicle 200. The use acceptance information is stored in the database 130. Next, the control unit 110 provides information of the extracted shared vehicles 200 for the user who has made the use request in Step S101 through the user terminal 400. Then, in a case where the user selects a shared vehicle 200 to be used, the control unit 110 receives information of the selected shared vehicle 200 from the user terminal 400.

In Step S103, the control unit 110 reads information of parking spaces from the database 130 and extracts proposed return spaces that are currently available parking spaces among the parking spaces. Next, the control unit 110 provides information of the extracted proposed return spaces for the user who has made the use request in Step S101 through the user terminal 400. Then, in a case where the user selects a planned return space for returning the shared vehicle 200 among the proposed return spaces, the control unit 110 receives information of the selected planned return space from the user terminal 400.

In Step S104, the control unit 110 determines whether or not an operation of finalizing the use request has been executed by the user who has made the use request in Step S101 through the user terminal 400. Then, in Step S104, in a case where the operation of finalizing the use request has been executed, the control unit 110 generates use acceptance information and planned return space information for the shared vehicle 200. Next, the control unit 110 stores the generated information in the database 130 and ends the process of acceptance of the request for using the shared vehicle 200. On the other hand, in Step S104, in a case where the operation of finalizing the use request has not been executed, the process is returned to Step S102, and, again, in Steps S102 and S103, the process waits until the selection of a vehicle and the selection of a planned return space are made by the user.

Figure 4:
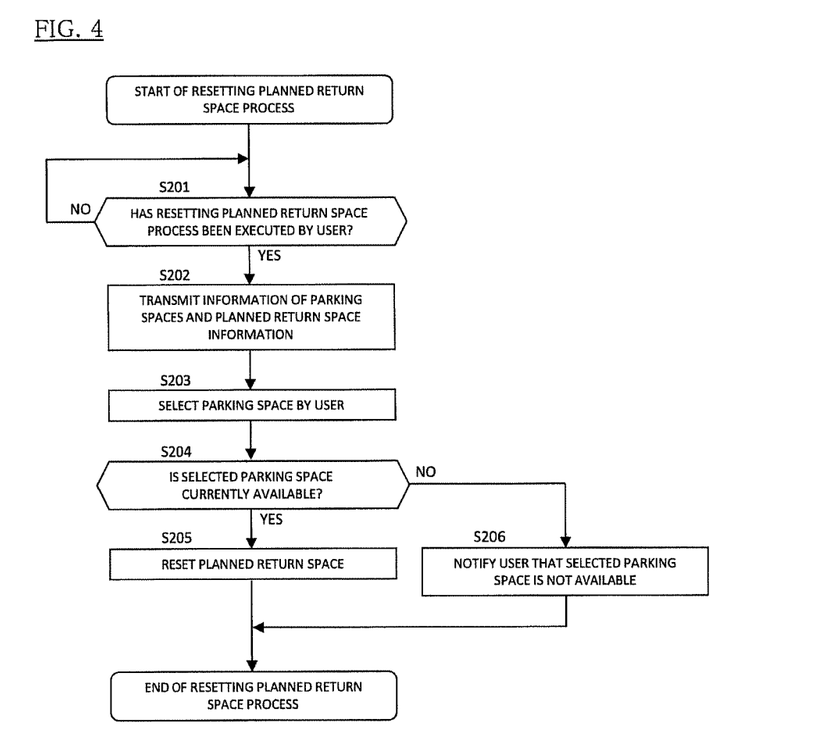
FIG. 4 is a flowchart that illustrates a process for resetting a planned return space for a vehicle according to one or more embodiments of the present invention.

Next, an example of the operation that is executed when a planned return space is reset while the shared vehicle 200 is occupied (used or reserved for use) by the user will be described with reference to a flowchart illustrated in FIG. 4.

First, in Step S201, the control unit 110 determines whether or not the process of resetting the planned return space is executed by the user using the shared vehicle 200 through the user terminal 400. In a case where the process of resetting the planned return space is executed, the process proceeds to Step S202. On the other hand, in a case where the process of resetting the planned return space is not executed, the process waits in Step S201.

In Step S202, the control unit 110 reads the information of each parking space and the planned return space information of the shared vehicle 200, that is occupied by the user executing the process of resetting the planned return space in Step S201, from the database 130. Then, the control unit 110 provides the information of each parking space and the planned return space information to the user through the user terminal 400.

In Step S203, in a case where the user selects a parking space to be reset as the planned return space on the basis of the information provided in Step S202, the control unit 110 receives information of the selected parking space from the user terminal 400.

In Step S204, the control unit 110 determines whether or not the parking space selected by the user in Step S203 is currently available. Here, as proposed return spaces that are currently available parking spaces, there are, for example, parking spaces, in which any shared vehicle is not parked, each not being set as a planned return space for any shared vehicle 200 and the like. Here, whether a parking space is set as the planned return space for the shared vehicle 200 can be determined on the basis of the planned return information of each shared vehicle 200 that is stored in the database 130. In addition, as a method of checking whether or not a parking space is used for parking a vehicle, for example, a method in which the presence/absence of a vehicle in the parking space is checked by using a sensor disposed in advance near each parking space may be used. Then, in Step S204, in a case where it is determined that the parking space selected by the user is currently available, the process proceeds to Step S205. On the other hand, in Step S204, in a case where it is determined that the parking space selected by the user is not currently available, the process proceeds to Step S206.

In Step S204, in a case where it is determined that the parking space selected by the user is currently available, the process proceeds to Step S205. In Step S205, the control unit 110 resets the parking space as the planned return space for the shared vehicle 200 that is occupied by the user and ends the process of resetting the planned return space.

On the other hand, in Step S204, in a case where it is determined that the parking space selected by the user is not currently available, the process proceeds to Step S206. In Step S206, the control unit 110 notifies the user that the selected parking space cannot be currently set as the planned return space and ends the process of resetting the planned return space.

As described above, in one or more embodiments of the present invention, the control unit 110 of the management server 100 provides the information of each parking space for the user. Then, in a case where a parking space to be reset as the planned return space is selected by the user among the provided parking spaces information, when the selected parking space is currently available, the control unit 110 can reset the selected parking space as the planned return space for the shared vehicle 200 that is occupied by the user. In this way, according to one or more embodiments of the present invention, the user occupying the shared vehicle 200 can appropriately change the planned return space used for returning the shared vehicle 200. For this reason, according to one or more embodiments of the present invention, the flexibility at the time of returning the shared vehicle 200 enhances, and the convenience of the vehicle sharing service can be improved.

Figure 5:
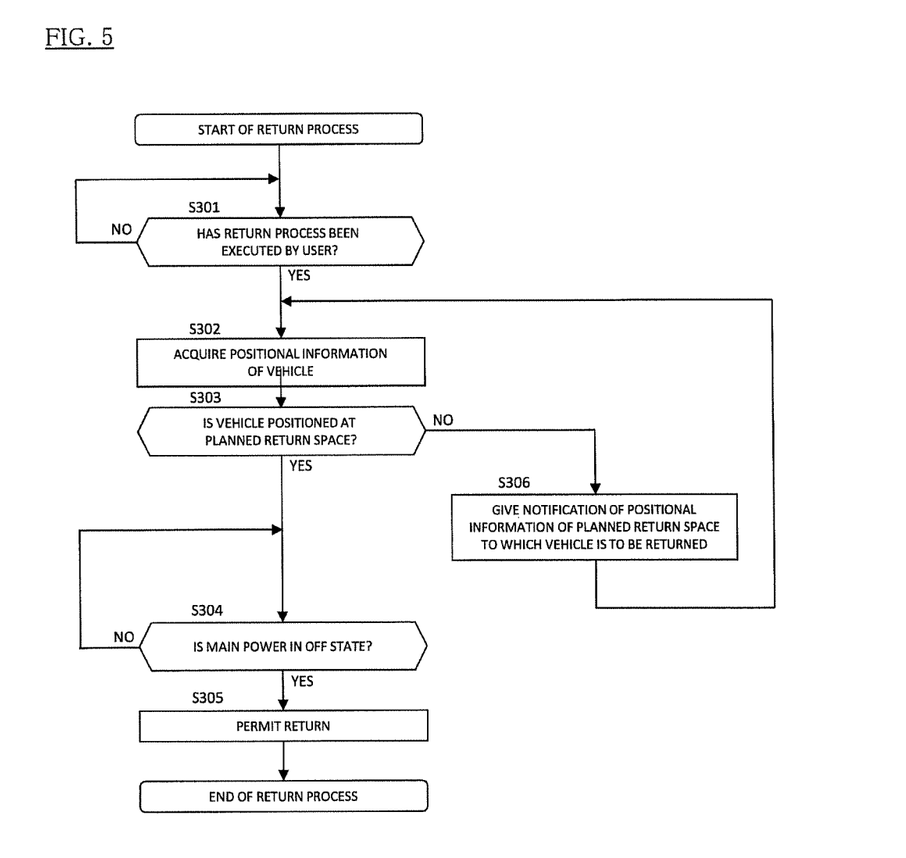
FIG. 5 is a flowchart that illustrates a process for returning a vehicle according to one or more embodiments of the present invention.

Next, an example of the operation of the return process executed when the user returns a shared vehicle 200 that has been used will be described with reference to a flowchart illustrated in FIG. 5.

First, in Step S301, the control unit 110 determines whether or not the process of returning a shared vehicle 200 is executed by a user using the shared vehicle 200 through the user terminal 400. In a case where the process of returning the shared vehicle 200 is executed, the process proceeds to Step S302. On the other hand, in a case where the process of returning the shared vehicle 200 is not executed, the process waits in Step S301.

In Step S302, the control unit 110 acquires information of the current position of the shared vehicle 200. As a method of acquiring the information of the current position of the shared vehicle 200, there is, for example, a method in which the control unit 110 of the management server 100 execute positioning with a GPS.

In Step S303, the control unit 110 determines whether or not the shared vehicle 200 is positioned at the planned return space on the basis of the information of the current position of the shared vehicle 200 that is acquired in Step S302. Then, in Step S303, in a case where the shared vehicle 200 is positioned at the planned return position, the process proceeds to Step S304. On the other hand, in Step S303, in a case where the shared vehicle 200 is not positioned at the planned return position, the process proceeds to Step S306.

In Step S303, in a case where the shared vehicle 200 is positioned at the planned return position, the process proceeds to Step S304. In Step S304, the control unit 110 determines whether or not the main power of the shared vehicle 200 is turned to be in the OFF state by the user. Then, in Step S304, in a case where the main power of the shared vehicle 200 is in the OFF state, the process proceeds to Step S305. On the other hand, in a case where the main power of the shared vehicle 200 is not in the OFF state, the process proceeds to Step S304.

In Step S304, in a case where the main power of the shared vehicle 200 is in the OFF state, the process proceeds to Step S305. In Step S305, the control unit 110 permits the return of the shared vehicle 200. The control unit 110 notifies the user of the completion of the return of the shared vehicle 200 through the user terminal 400, and ends this process.

On the other hand, in Step S303, in a case where the shared vehicle 200 is not positioned at the planned return space, the process proceeds to Step S306. In Step S306, the control unit 110 provides the positional information of the planned return space for the shared vehicle 200, that is used by the user, for the user through the user terminal 400. In addition, the control unit 110 notifies the user to return the shared vehicle 200 to the planned return space. Then, in the flowchart represented in FIG. 5, the process is returned to Step S302, and Steps S302 and S303 described above are executed again.

As described above, according to one or more embodiments of the present invention, the control unit 110 first sets the planned return space for the shared vehicle 200 at a time point when a user's request for using the shared vehicle 200 is accepted. Then, when the return process is executed after the user uses the shared vehicle 200, the control unit 110 executes control such that the return process is not completed unless the shared vehicle 200 is returned to the planned return space. In this way, according to one or more embodiments of the present invention, when a drop off type service is provided in the vehicle sharing service, the shared vehicle 200 used by the user is returned to an appropriate return space.

In one or more of the embodiments described above, the usage managing function of the control unit 110 corresponds to a usage managing unit and an information providing unit. The return determining function of the control unit 110 according to one or more of the embodiments described above corresponds to a return determining unit. The return permitting function of the control unit 110 according to one or more of the embodiments described above corresponds to a return permitting unit.

As above, while embodiments of the present invention are described above, the embodiments are described for easy understanding of the present invention but is not for the purpose of limiting the present invention. Thus, each element disclosed in the embodiments described above includes all the changes in design and all the equivalents belonging to the technical scope of the present invention.

For example, in one or more of the embodiments described above, as an example of the vehicle management system, the vehicle sharing service of the short distance drop off type has been illustrated. However, the vehicle management system is not limited to the above embodiments, but may be applied to, for example, a vehicle sharing service of a long-distance drop off type, a rent-a-car system, a vehicle lease system, and the like.

In addition, in one or more of the embodiments described above, as the method of determining whether or not the shared vehicle 200 is returned to the planned return space by using the control unit 110, the method using the GPS has been described as an example. The vehicle management system according to one or more embodiments of the present invention may make the determination, for example, using a method as below in addition to the GPS or instead of the GPS.

First, a unique position specifying code is disposed in each parking space in advance. While the unique position specifying code disposed in each parking space is not particularly limited. As examples of the unique position specifying code, there are a position specifying bar code, a two-dimensional code, a display board on which alphabets, numbers, and the like are displayed, a terminal in which position specifying electronic data is stored, and the like. When a shared vehicle 200 is returned by a user, the control unit 110 commands the onboard device 210 of the returned shared vehicle 200 so as to read information of the unique position specifying code described above by using a camera, a sensor, a communication device, or the like mounted in the shared vehicle 200. Next, in a case where the read information of the unique position specifying code represents the planned return space set to the shared vehicle 200, the control unit 110 determines that the shared vehicle 200 is returned to the planned return space. As above, according to the method of reading the information of a unique position specifying means disposed in each parking space, the following advantages are acquired. On a scene which it is not determined whether or not the shared vehicle 200 is positioned at the planned return space by using the GPS, for example, a scene on which two or more parking spaces are located within the position detecting error range of the GPS, a case where electric waves of the GPS are not reachable, or the like, it can be correctly determined in a simple manner whether or not the shared vehicle 200 is positioned at the planned return space.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

100 Management server
110 Control unit
120 Communication unit
130 Database
200 Shared vehicle
300 Internet
400 User terminal

What is claimed is:
1. A vehicle management system for managing a plurality of vehicles used by a plurality of users, comprising:
a storage device; and
a controller coupled to the storage device, comprising:
a parking space managing unit that controls storage of parking management information for the plurality of vehicles in a database in the storage device, wherein the parking management information comprises occupied parking space information and planned return space information; and
a usage managing unit that receives, from a user terminal, request from one of the plurality of users to use one of the plurality of vehicles, sets a planned return space which is selected from the parking management information, and sends information on the planned return space to the user terminal,
wherein the usage managing unit, while the one of the plurality of users is using the one of the plurality of vehicles, prevents the planned return space from being set as a planned return space for any other vehicle, and
wherein when resetting of the planned return space is requested, the usage managing unit proposes a new return space that is different from the planned return space, is not set as a planned return space for any other vehicle, and is not occupied according to the occupied parking space information; and sends information on the new return space to the user terminal.

2. The vehicle management system according to claim 1, wherein the parking space managing unit reads the parking management information from the database in the storage device, and
wherein the usage managing unit extracts at least one proposed return space that is a currently available parking space from the parking management information and sends information of the at least one proposed return spaces to the user terminal.

3. The vehicle management system according to claim 1, wherein controller further comprises:
a determination unit that determines that the one of the plurality of vehicles has been returned to the planned return space based on position information of the vehicle retrieved from the vehicle, and
a notification unit that notifies the user of completion of the return of the one of the plurality of vehicles through the user terminal.

4. The vehicle management system according to claim 1, wherein the controller further comprises:
a positional information acquiring unit that acquires information of a current position of the one of the plurality of vehicles from a Global Positioning System when the one of the plurality of vehicles is actually used and returned by the user; and
a return determining unit that compares the current position obtained by the positional information acquiring unit with the planned return space set by the usage managing unit and determines whether or not the one of the plurality of vehicles has been returned to the planned return space set by the usage managing unit.

5. The vehicle management system according to claim 1, wherein the request from one of the plurality of users is a request for immediate use of the one of the plurality of vehicles.

6. The vehicle management system according to claim 1, wherein parking spaces used for setting planned return spaces are disposed at a small gap within a small district.

7. The vehicle management system according to claim 1, wherein a gap between the parking spaces for setting planned return spaces corresponds to a gap at which a user can easily come and go on foot.

8. A vehicle management method for managing a plurality of vehicles used by a plurality of users, comprising:
controlling storage of parking management information for the plurality of vehicles in a database, wherein the parking management information comprises occupied parking space information and planned return space information;
receiving from a user terminal, a request from one of the plurality of users to use one of the plurality of vehicles,
setting a planned return space which is selected from the parking management information stored in the database through the user terminal;
preventing, while the one of the plurality of users is using the one of the plurality of vehicles, the planned return space from being set as a planned return space for any other vehicle;
proposing, upon receipt of a request to reset the planned return space, a new return space, that is different from the planned return space, is not set as a planned return space for any other vehicle, and is not occupied according to the occupied parking space information; and
sending information on the new return space to the user terminal.

9. A program stored on a non-transitory computer-readable medium that causes a computer to perform a vehicle management method for managing a plurality of vehicles used by a plurality of users, comprising:
controlling storage of parking management information for the plurality of vehicles in a database, wherein the parking management information comprises occupied parking space information and planned return space information;
receiving from a user terminal, a request from one of the plurality of users to use one of the plurality of vehicles;
setting a planned return space which is selected from the parking management information stored in the database through the user terminal;
preventing, while the one of the plurality of users is using the one of the plurality of vehicles, the planned return space from being set as a planned return space for any other vehicle;
proposing, upon receipt of a request to reset the planned return space, a new return space, that is different from the planned return space, is not set as a planned return space for any other vehicle, and is not occupied according to the occupied parking space information; and
sending information on the new return space to the user terminal.

* * * * *